(12) United States Patent
Xia et al.

(10) Patent No.: US 7,747,124 B2
(45) Date of Patent: Jun. 29, 2010

(54) SYSTEM AND METHOD FOR PROVIDING LARGE SCALE, AUTOMATED, FIBER-OPTIC, CROSS-CONNECTION

(75) Inventors: Tiejun J. Xia, Richardson, TX (US); Glenn A. Wellbrock, Wylie, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 11 days.

(21) Appl. No.: 12/165,122

(22) Filed: Jun. 30, 2008

(65) Prior Publication Data

US 2009/0324179 A1 Dec. 31, 2009

(51) Int. Cl.
G02B 6/46 (2006.01)
G02B 6/54 (2006.01)
G02B 6/255 (2006.01)

(52) U.S. Cl. .......................... 385/135; 385/95; 385/99; 385/134; 385/136; 385/139

(58) Field of Classification Search .................. 385/135
See application file for complete search history.

(56) References Cited

U.S. PATENT DOCUMENTS 6,973,251 B2 * 12/2005 Morellec et al. ............ 385/135

* cited by examiner

Primary Examiner—Michelle R Connelly Cushwa

(57) ABSTRACT

A system and method for automatically inserting optical-fiber (fiber-optics) cable jumpers into a patch panel to connect optical signal source equipment to optical signal destination equipment, and for automatically removing those jumpers from that patch panel to disconnect that equipment. This is accomplished robotically under computer control. Large scale fiber-optical splicings can be made, on the order often thousand (10,000) separate optical splices or more. Previous embodiments required hand insertion of these jumpers. Embodiments of the present invention permit any un-occupied port to be connected to any other un-occupied port, regardless of their input or output port status, where previous embodiments required only unoccupied input ports to be connected to unoccupied output ports.

17 Claims, 9 Drawing Sheets

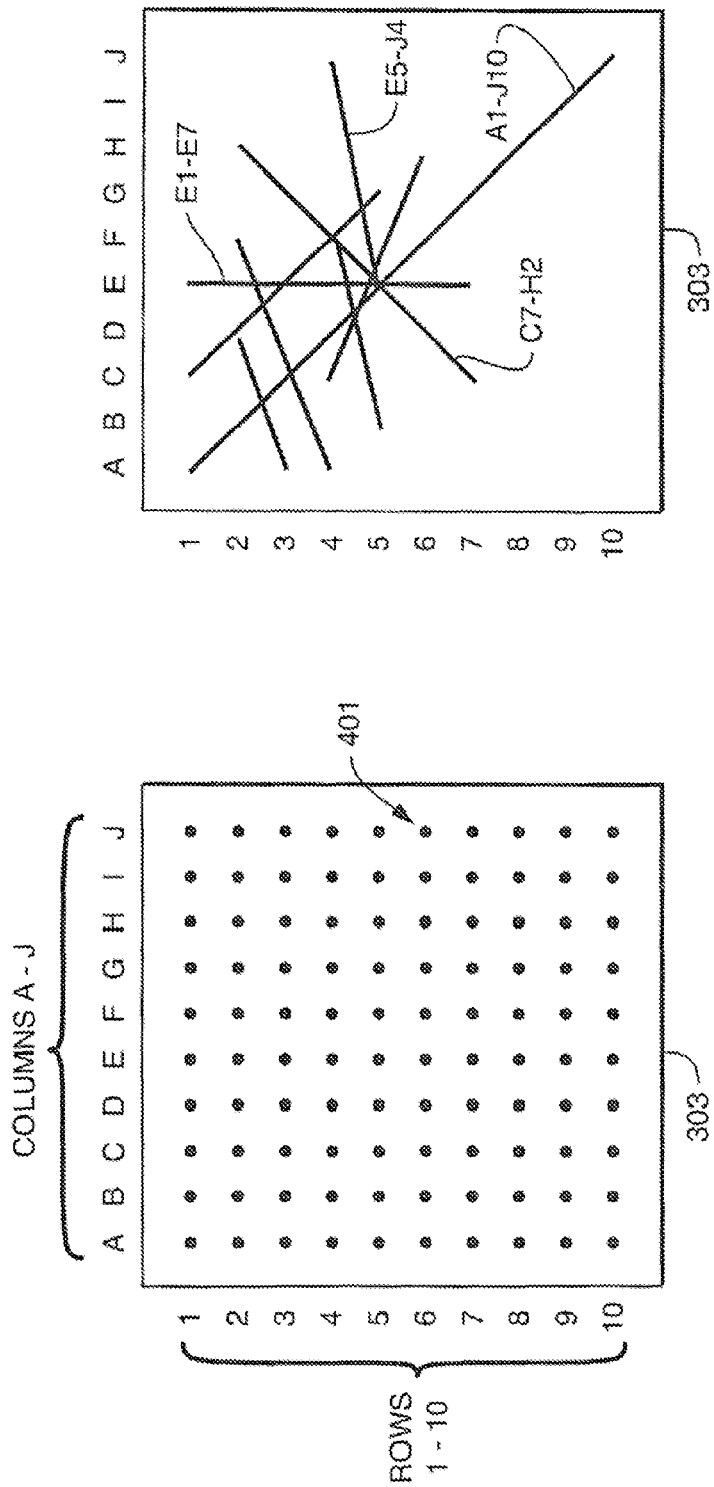
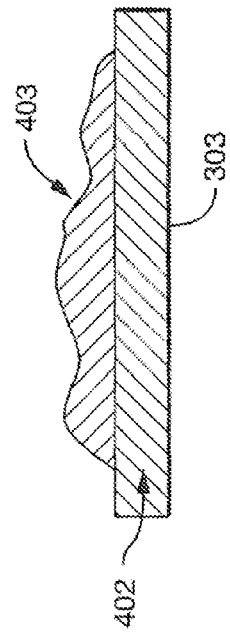
FIG. 4A
FIG. 4B
FIG. 4C

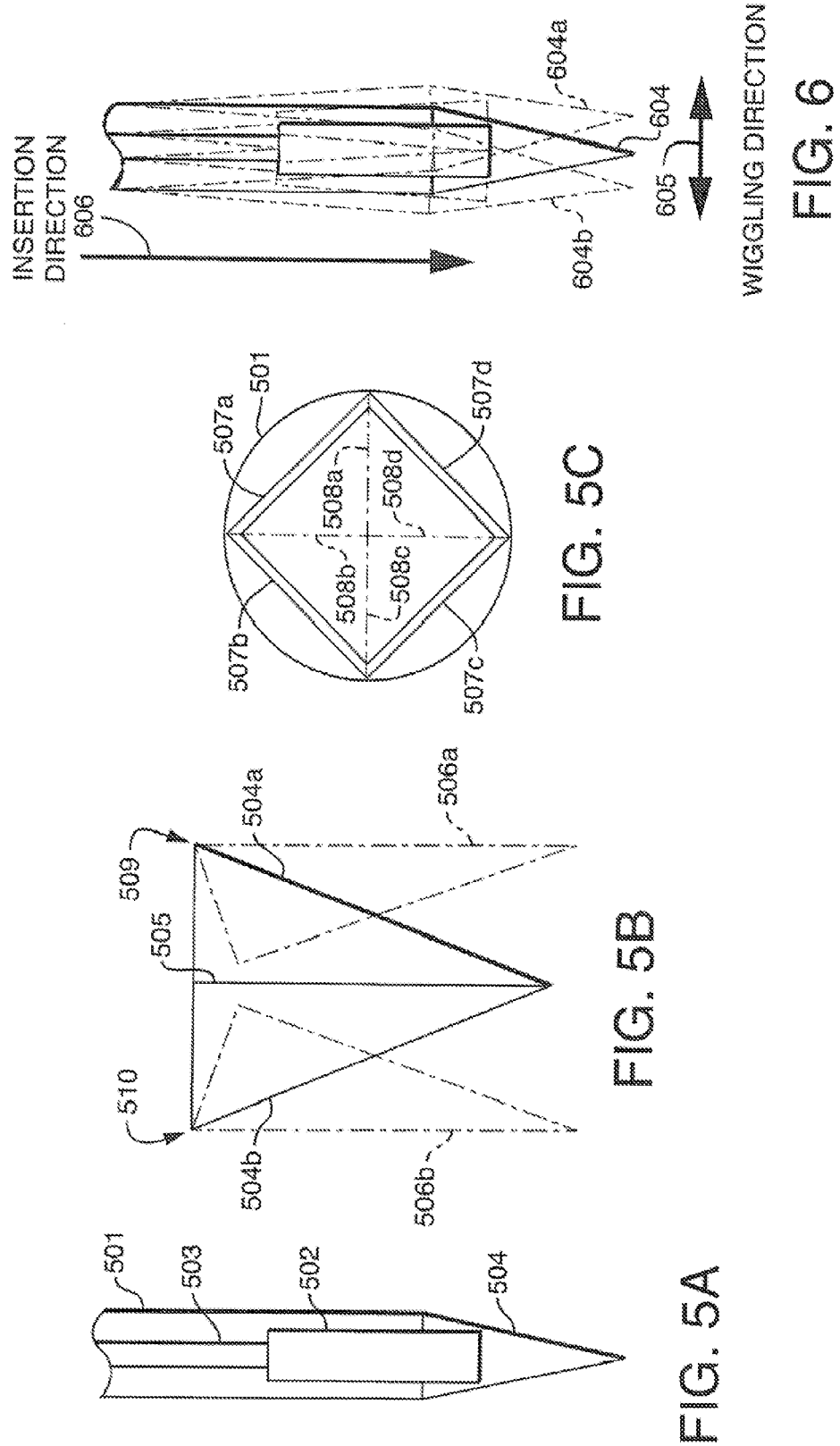

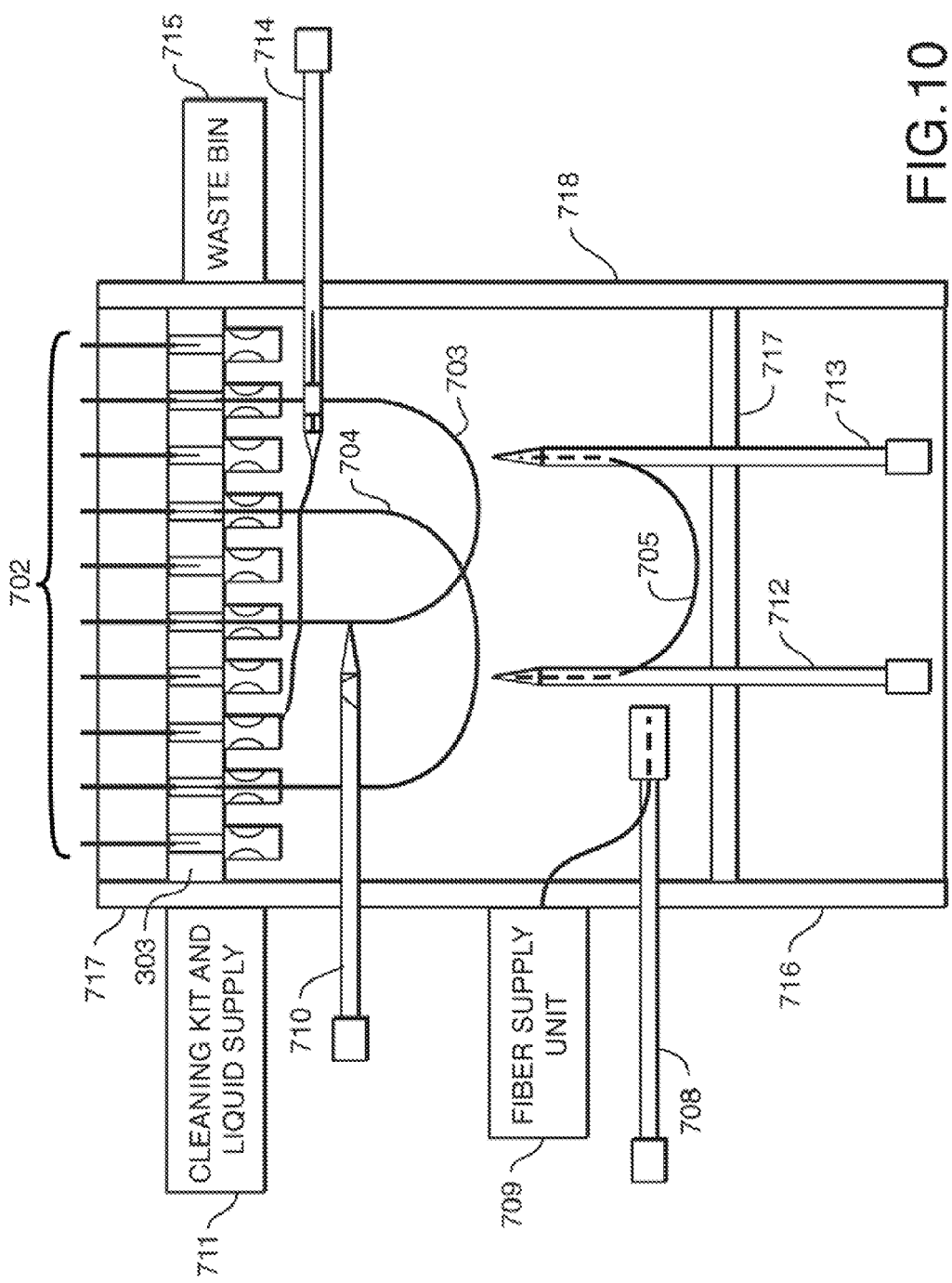

SYSTEM AND METHOD FOR PROVIDING LARGE SCALE, AUTOMATED, FIBER-OPTIC, CROSS-CONNECTION

BACKGROUND

The performance capability of fiber-optic (or optical-fiber) communication networks is superior in many respects to that provided by standard wireline networks. For example, fiber-optic cable bandwidth is much greater than copper wireline bandwidth allowing more communication at greater speed. Therefore, networks may be generally evolving in the direction of optical-fiber links. However, evolution from copper wire to fiber-optic cable may not be moving as fast as it otherwise could because working with copper wire is easier than working with optical-fiber. For example, copper wire connections can be fully automated, which is not the case with optical-fiber links.

The current state of fiber-optic networks, e.g., in a central office of a telecommunications company, includes usage of a manual patch panel, where all fiber-optic connections are still made by hand by highly-skilled and highly-trained technicians. This is costly and time-consuming. Although fully automatic optical switches are commercially available for certain applications in a fiber-optic network, they have not replaced the manual patch panel, at least because these switches are constrained to connect only input ports to output ports. In other words, input ports cannot be connected to other input ports in a commercially-available optical switch. This is illustrated in FIG. 1 where an optical switch is schematically shown as connecting input fiber on its left-hand side to output fiber on its right hand side. As depicted, this allows any currently unused (i.e., unoccupied) input port to be automatically switched, but only to any unused output port, and is an example of "any unused input port to any unused output port" capability.

However, in using a standard, manual optical patch panel, not only can one manually cross-connect any unused input port to any unused output port, one can also connect any unused input port to any other unused input port. This is illustrated in FIG. 2 which shows an end view or edge view of a manually-operable fiber patch panel. As can be seen, any signals coming from internal network equipment at the lower left of the drawing can be patched through the right-hand side optical cross-connectors (i.e., jumpers) to either other internal network equipment via, e.g., connection 201, or to outside plant cable via, e.g., connection 202, the outside plant cable being shown at the upper left-hand side of the drawing. This is an example of "any unused input port switched to any other unused port" capability which is desirable, but currently available only in manual format for fiber-optic cable. Since fiber-optic manual connections are very time consuming and expensive, there is a need to automate these connections, and subject matter of Applicants' instant specification, drawings and claimed embodiments satisfies that need.

BRIEF DESCRIPTION OF THE DRAWINGS

FIGS. 4a, 4b and 4c are further depictions of the exemplary optical-fiber patch panel of FIG. 3 in more detail, with FIG. 4a showing coordinated ports, FIG. 4b showing cable jumpers and FIG. 4c showing buildup of jumper cable mass;

FIG. 5a is a schematic diagram of one end of an exemplary robotic arm holding an end of a fiber-optic cable enclosed in an exemplary hollow end-encapsulator needle, FIG. 5b how the example of FIG. 5a operates and FIG. 5c shows an example of the encapsulator-needle;

FIG. 6 is a schematic diagram depicting the exemplary subject matter shown in FIG. 5 but also showing the effect of wiggling;

FIG. 10 shows an alternate example of FIG. 7 wherein vertical orientation of the optical-fiber patch panel and robotics of the robotic subsystem is reversed.

DETAILED DESCRIPTION OF PREFERRED EMBODIMENTS

Figure 1:
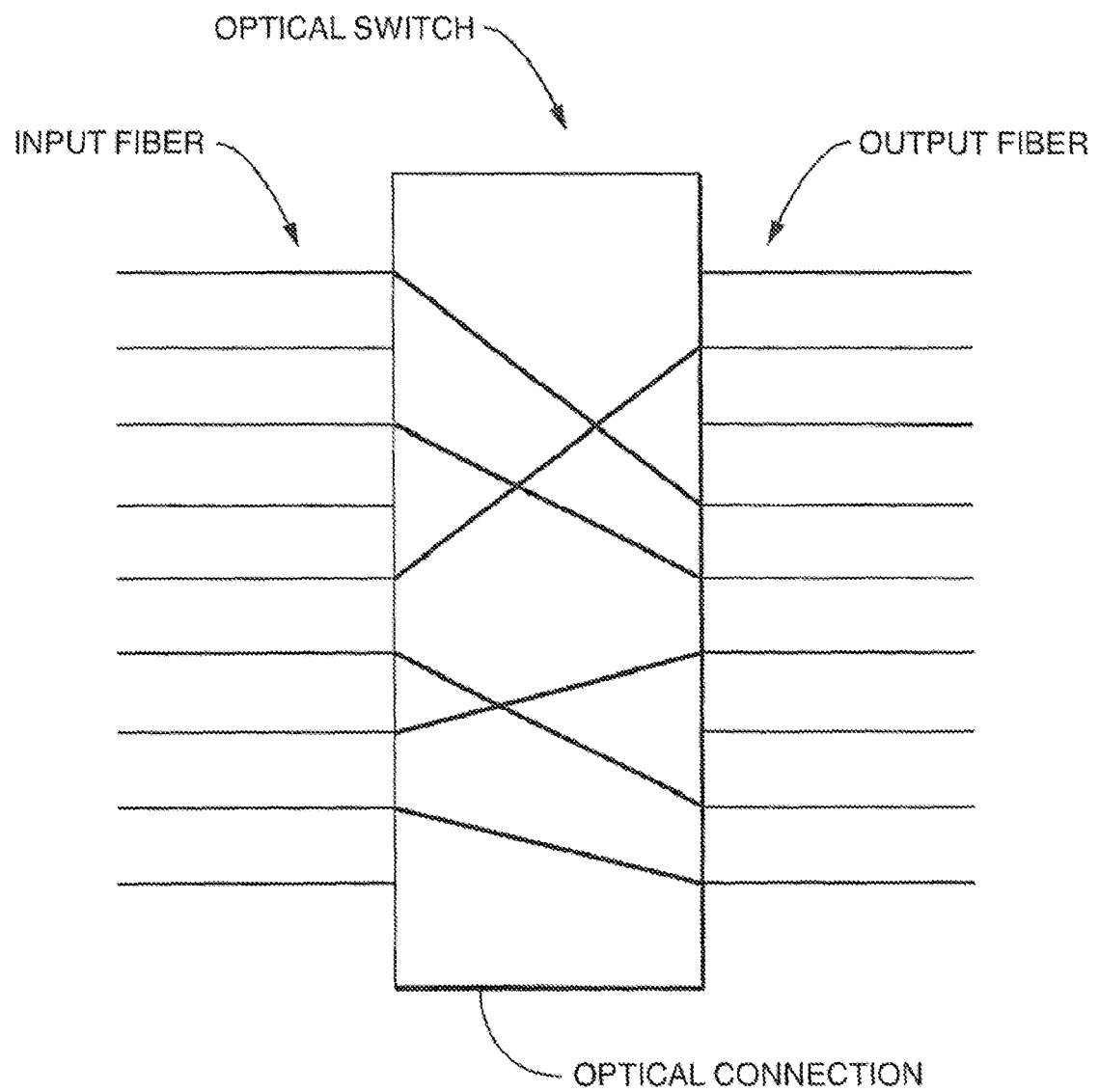
FIG. 1 is a schematic diagram of an exemplary state-of-the-art optical switch.
Figure 2:
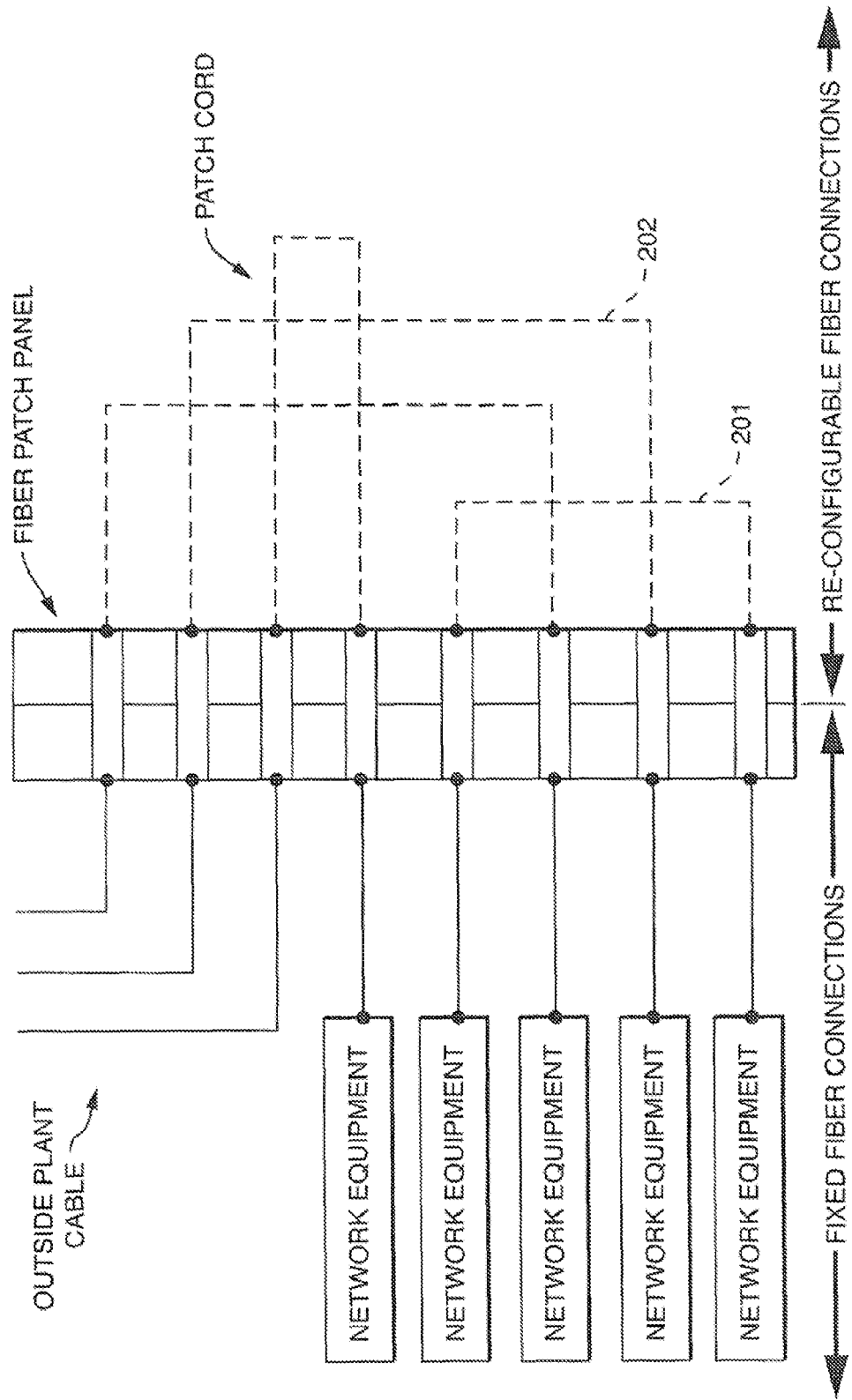
FIG. 2 is a schematic diagram of an exemplary state of the art manually-configured optical-fiber patch panel.

In this description, the same reference numeral in different Figs. is referring to the same entity. Reference numerals of each Fig. start with the same number as the number of that Fig. For example, FIG. 6 has numerals in the "600" category and FIG. 7 has numerals in the "700" category, etc. Thus, if discussing an entity in a Fig. having a particular reference numeral not starting with the same number as that Fig. one can easily refer back to the appropriate Fig.

Examples include system and method for robotically splicing fiber-optic cable. For example, there is disclosed an automated optical-fiber splicing system comprising a fiber-optic cable splicing multi-port panel wherein the cable splicing is accomplished by robotic operation. The robotic operation is provided by a robotic subsystem under control of a computer which is programmed by a user to automatically accomplish the user's desired splicing result. The multi-port panel has two sides and includes an array of fiber-optic cable ports (i.e., splicing-ports) extending there-through. (In this description, the terms "ports," "cable-ports" and "splicing-ports" may be used interchangeably, whereas "splicing-tubes" are internal to these ports.) Each such port and tube include the mechanical constraints needed, both length and angular orientation constraints, to ensure that the optical-fibers inserted from both sides of the panel into the port containing that tube shall mate properly. That array can be a large number of ports such as, for example, 10,000 ports or more, laid out in a grid style, e.g., 100 ports along each axis. In any subsequent references herein to insertions of optical fibers into ports and to removals of optical fibers from ports, it is to be understood that these are insertions into, and removals from, the tubes inside the ports.

Initially, various fiber-optic equipment cables are manually attached to some or all of the ports on one side of the panel by manually inserting and/or attaching one of each such cable's two ends. The other ends of these cables were previously connected to local, or remotely-located, optical signal source or destination equipment. To make a complete fiber-optic communicative connection between various pairs of such signal source and signal destination equipment, on the other side of the panel fiber-optic cable jumpers are used. These fiber-optic cable jumpers are each robotically connected, in an automatic and fully operative manner, between a different pair of the fiber-optic cable ports on the other side of the panel, thereby providing a completed optical-fiber communication connection between the equipment connected to each such pair of ports.

After a buildup of cable jumpers occurs responsive to substantial repetition of robotically-controlled jumper insertions into the fiber-optic cable ports, that buildup may tend to impede efforts made to accomplish subsequent insertions. Therefore, exemplary embodiments can include hollow end-encapsulator needles affixed to the ends of jumper cables carried by the robotic arms, such needles offering an appropriate "pointy" geometry to allow threading, or snaking-between, other cables which may be lying in their path.

In addition, to enhance the threading-between such a buildup and penetrating there-through to a target cable port, a wiggling or dithering feature, is provided in an exemplary embodiment. This allows short, rapid displacements of the end-encapsulator needles, made orthogonally to direction of insertion, to enable the robotic arms to push such buildup aside and penetrate there-through to the target cable ports. (For a particular jumper, target cable ports are the two ports which are intended to receive the insertion of the ends of that jumper.)

The actual splicing (i.e., actual mating) of the end of the glass fiber of the jumper cable to the end of the glass fiber of the equipment cable, takes place internal to splicing-tubes inside of the splicing-ports located within the multi-port panel. The dimension-constraints and insertion-orientation-constraints, with tight tolerances, for each such splicing-port with its included splicing-tube, on both the equipment cable side and the opposite jumper cable side, ensure virtually perfect mating of the glass surfaces at the ends of the glass fibers associated with each of the two cables that are inserted into that port from opposite sides of the panel. In other words, robotic insertion of each needle-protected optical-fiber on the jumper cable side provides a substantially congruent match between its end and the end of the glass fiber on the equipment cable which had previously been manually inserted into that splicing-port oil the equipment cable side. Constraints of length and angular orientation are disclosed, for example, in U.S. Pat. No. 7,316,513, entitled: "Optical-Fiber Mechanical Splicing Technique" which is assigned to the assignee of the instant application and hereby incorporated herein by reference.

Figure 3:
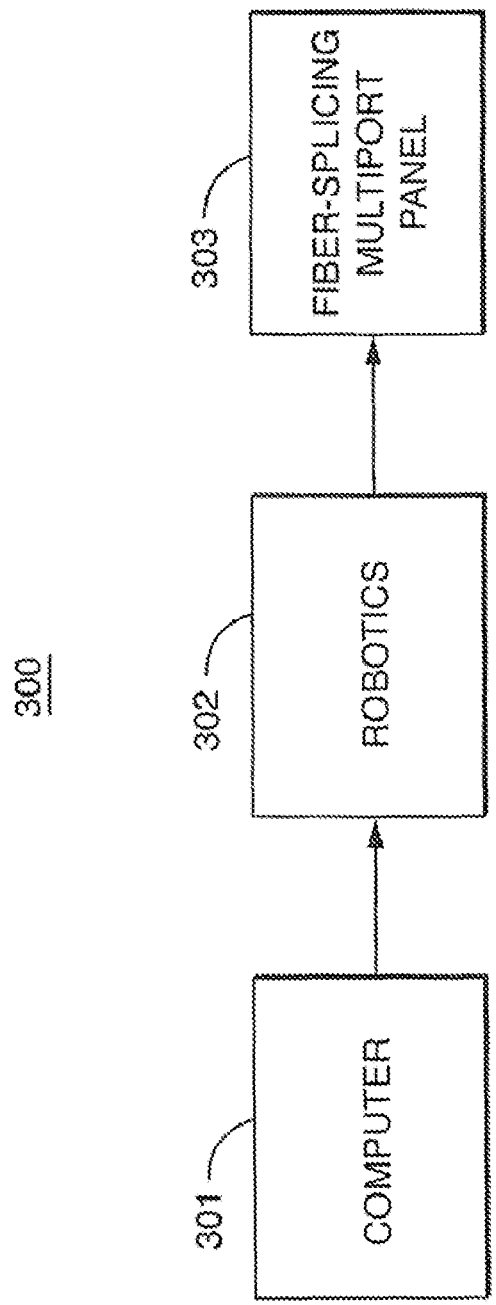
FIG. 3 is a functional block diagram of an exemplary fully-automated system for configuring an optical-fiber patch panel.

FIG. 3 is a functional block diagram of an exemplary fully-automated system 300 for configuring an optical-fiber patch panel. FIG. 3 shows computer 301, robotics subsystem 302 and fiber-splicing multi-port panel 303. Computer 301 is a dedicated computer of standard design and commercial-availability, running an applications program which controls robotic subsystem 302. Computer 301 can be, for example, a Dell Latitude D360 computer, and the applications program can be written in any of a number of computer languages such as, for example, Labview™ software. Robotics subsystem 302 is likewise constructed from state of the art robotic technology using well known robotic principles to meet the requirements as set forth in this application. U.S. Pat. No. 4,677,734, entitled "Robotic Wire Harness Assembly System" and U.S. Pat. No. 4,715,100, entitled "Wire Routing Tool For Robotic Wire Harness Assembly" are examples of robotic grasping and movement of wire which may be relevant to the robotic function of the instant application, and each such patent is incorporated herein by reference in its entirety.

It should be understood that FIG. 3 depicts an exemplary embodiment from a high-level view. Computer 301 controls robotic sub-system 302 to insert fiber-optic cable jumpers (not shown) into multi-ported panel 303 to make specific optical-signal connections (not shown) between specific pieces of equipment (not shown), and to remove the jumpers on a selected basis. More detail about fiber-splicing multi-port panel 303 is shown in FIGS. 4a-c.

FIG. 4a is a schematic representation of an exemplary patch panel 303 showing an array of ports having ten rows labeled "1" through "10" and ten columns labeled "A" through "J" which permits identification of a particular port by its row/column coordinates. For example, port 401 is identified in this manner as port "J6". Accordingly, FIG. 4a depicts a total of an exemplary 100 individual ports. However, embodiments can encompass 10,000 or more ports per panel, where 1000 rows and 1000 columns are used. The number of ports per panel is limited primarily by size constraints of the environment in which the panel is situated. For example, a 10,000 port panel with associated robotics subsystem may require a space of approximately 2-3 feet width, 2-3 feet height, and 2-3 feet depth (between eight and twenty-seven cubic feet, more or less). It is intended that these embodiments can be installed with full robotic operation as described herein, within a central office environment of a telecommunications company.

FIG. 4b is a schematic representation of the patch panel 303 of FIG. 4a into which various optical-fiber jumper cables have been robotically inserted. The depicted jumper cables can be identified by their respective coordinates, as exemplified by four jumper cables: A1-J10, C7-H2, E1-E7 and E5-J4. These four jumper cables are the only labeled jumper cables in FIG. 4b, but the other cables can likewise be identified by their coordinates. All of these jumper cables are shown schematically as straight lines for ease of illustrating the desirability, or need, for various embodiments. Actually, however, jumper cables are robotically inserted with particular lengths determined by computer program to provide varying degrees of slack as discussed further hereinbelow.

As can be seen, jumper cables A1-J10, C7-H2 and E1-E7 all overlap port E5. Therefore, if these three jumper cables were robotically inserted prior to insertion of jumper E5-J4, any subsequent jumper-insertion attempt into port E5, as represented by, e.g., jumper E5-J4, may be partially blocked by cross connector buildup of these three prior-inserted cables. Robotic insertion of jumper E5-J4 would need to take into account this buildup and maneuver around the other three jumpers. This illustrative example of taut, straight-line jumpers, which lie immediately in the path of an E5 port insertion, is a more severe situation than that which realistically occurs, since slack in each jumper is intentionally included to enable ease of subsequent cable insertions. However, if, e.g., some forty-plus cables have been inserted into a panel of 100 ports, where only eight cables are illustrated in FIG. 4B, it can represent a buildup or a cable mass which, for example, may offer some challenge, despite its extra-slack feature. That buildup is schematically shown in FIG. 4c which depicts panel 303 on edge, or on end, showing its thickness 402, and buildup of prior-inserted cables, in the aggregate, as mass 403. Of course, with a 10,000 port panel allowing some 5000 cross-connect cable jumpers, each jumper connecting a different pair of ports, the cable buildup mass can be substantial. Exemplary embodiments can include features to manage this challenge as, for example, shown in FIGS. 5a-c.

FIG. 5a is a schematic diagram of an exemplary end of a robotic arm holding an end of a fiber-optic cable enclosed in a hollow end-encapsulator needle configured from metal such as steel or aluminum, or hard plastic. The outline boundary of encapsulator needle 504 is shown in a side view and has a piercing end 505 to maneuver between cross-lying cables. Working unit 502 is encapsulated by robotic arm 501 as well as by encapsulator needle 504, as shown, and receives control signals and power via conduit 503 which lies internal to robotic arm 501. Working unit 502 provides robotic fingers and any necessary mechanical motion to those fingers to accomplish optical-fiber splicing in according to exemplary embodiments. Jumper cable is not shown in this Figure. to enhance clarity of presentation.

FIG. 5b illustrates a side view of encapsulator needle 504, configured in a conical shape according to an exemplary embodiment. In its closed position, seam 505 is formed as a boundary between two half-conical surfaces 504a and 504b, mated together. In an open position of encapsulator needle 504, half conical surface 504a is depicted in dashed line format as half-conical surface 506a, and half conical surface 504b is depicted in dashed line format as half conical surface 506b. In its open position, encapsulator needle 504 pivots around two hinged supports (not shown) located at positions 509 and 510. In its open position, working unit 502 is extended through the opening formed by the open two conical surfaces to accomplish connection or disconnection of the jumper cable (not shown in this Fig.). Alternately, a different number of surfaces such as, e.g., four equally-sized conical surfaces could have been used instead of two.

FIG. 5c depicts an alternative construction of encapsulator needle 504. In this Fig., needle 504 is viewed in a top view as being in an open condition and pointing up from the surface of the drawing page. More specifically, this configuration uses four triangularly-shaped flat-plane panels (as differentiated from the two conically-surfaced sections of the previous paragraph) which, when folded together along dashed boundary lines 508a,b,c,d, form a pyramid pointing up from, and out of, the surface of the drawing. In the open condition in which they are depicted, each panel, i.e., each of panels 507a,b,c,d is orthogonal to the plane of the drawing. This configuration offers more structure about which to create the hinged supports, the axes of rotation of which can lie along the respective interfaces between 507a,b,c,d and structure of robotic arm 501.

In the geometrical limit, an equally-sided polygon more closely approximates a circle as the number of sides increase. Accordingly, FIGS. 5b and 5c are related in this respect and the number of flat-plane triangular sides 508 can vary from a minimum of three to many more than four according to an exemplary embodiment. The functionality of these embodiments can provide a pointy exterior to snake past other cables when closed, while allowing a sufficiently large opening of the encapsulator needle, when opened, to allow the working unit of the robot's arm to protrude there-through for purposes of accomplishing fiber-optic cable insertion and removal according to an exemplary embodiment. The triangularly-shaped flat plane panels and the previously-described conically-surfaced sections mate tightly with each other when folded together in a pyramid, or cone, respectively, to avoid accidentally ensnaring any cross cable.

FIG. 6 is a schematic diagram depicting the subject matter shown in FIG. 5a. and further depicting the effect of wiggling encapsulating needle 604 in directions 605 (e.g., the X-Y directions, defined further hereinbelow) that are orthogonal to encapsulating needle insertion direction 606 (e.g. the Z direction, defined further hereinbelow). Encapsulator needle 604 is constructed from suitable metallic material such as steel or aluminum, or from hard plastic, in accordance with any of the conical or pyramidal embodiments described in connection with FIG. 5b or 5c. When encapsulator needle 604 moves in insertion direction (Z direction) 606 to the fiber-locker associated with its targeted splicing-port (both not shown in this Fig.), displacement of needle 604 in vibration direction 605 is reduced to zero to permit opening of the panels of needle 604 and insertion of the encapsulated optical-fiber through the fiber-locker and into that splicing-port.

Figure 7:
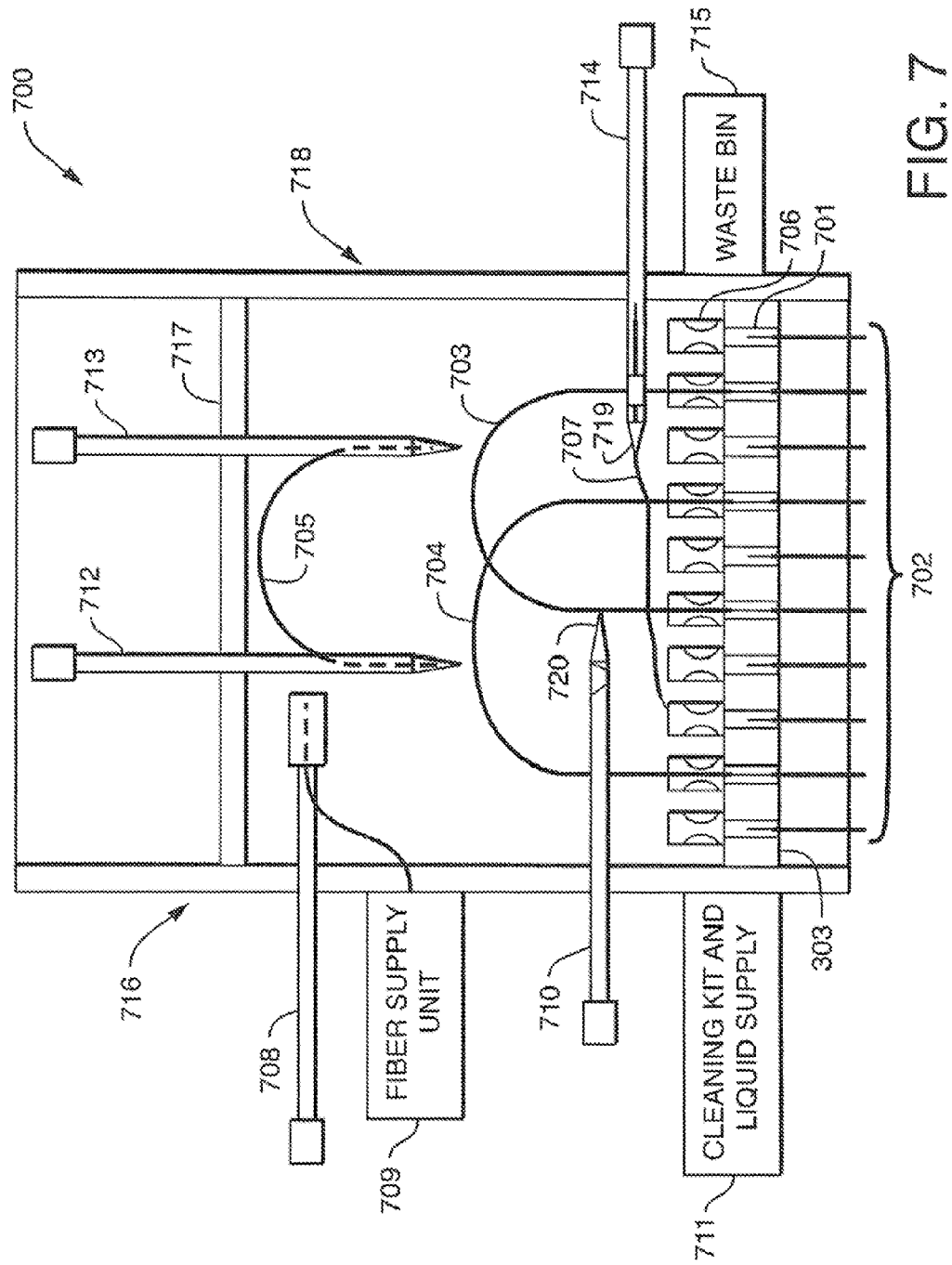
FIG. 7 is a schematic diagram of an end or edge view of an exemplary optical-fiber patch panel in operative contact with a robotic subsystem, all configured.

FIG. 7 is a schematic diagram of an end or edge view of an optical-fiber patch panel 303 in operative contact with robotic subsystem 700. The subsystem automatically inserts optical-fiber jumpers, such as jumper 705, into the panel, the panel and subsystem being configured in an exemplary embodiment. In a particular embodiment, panel 303 can be square-shaped, or rectangular-shaped, approximately two-three feet on a side, and approximately one-half inch to one-inch thick. Panel 303 holds a number of splicing-tubes 701 shown in this Fig. along an edge dimension of the panel. Although only ten tubes 701 are shown, that number can be 100 or more per edge, thereby providing 10,000 or more tubes in a square or rectangular panel. Each tube acts as a conduit for connecting equipment cables connected to one side of panel 303 to jumper cables connected to the other side of the panel.

Optical-fiber cables 702 at the bottom of the Fig. connect into splicing-tubes 701 on one side of panel 303, termed the equipment side. Each such cable is also connected at its other end to communication equipment or apparatus (not shown in this Fig.) which can be either a source of, or destination for, optical communication signals such as those associated with a telephone switching system, a network element, a network switch, a network router or other similar communication equipment. The sending and receiving roles of certain attached communication apparatus can be automatically alternated or reversed, where for one cycle or period of time the signal flow is from apparatus A to apparatus B, and in a subsequent cycle or period of time the signal flow is from apparatus B to apparatus A, such as with, for example, a client-server computer system doing up-loads and downloads or doing a network-path set-up.

Connections between respective pairs of signal source and signal destination apparatus are not complete until jumpers are inserted on the opposite side of panel 303, opposite from where the equipment cables are attached to their respective ports. Optical cross connector or jumper 703 interconnects two such source/destination optical-fibers, as does jumper 704 with respect to two other such source/destination optical-fibers. Fiber-lockers 706 are distributed throughout the panel, one locker outside of and adjacent each splicing-tube. Jumpers 703 and 704 had previously been inserted and locked into their respective splicing-tubes, as shown. Jumper 705 is shown to be ready for insertion into a pair of splicing-tubes. Jumper 707 was unlocked and it is being removed from its pair of splicing-tubes. All of this activity is under robotic control and is described below.

Robotic arm rails 716, 717 and 718 are schematically shown as supporting four robotic arms: robotic arms 708 and 710 supported by arm rail 716 at the left of the Fig.; robotic arms 712 and 713 supported by arm rail 717 at the top of the Fig.; and robotic arm 714 supported by arm rail 718 at the right of the Fig. Robotic arm 708 is associated with fiber supply unit 709, robotic arm 710 is associated with cleaning kit and liquid supply unit 711 and robotic arm 714 is associated with waste bin unit 715.

FIGS. 8a, 8b, 8c, 8d, 8e and 8f are six schematic diagrams depicting progress in the making of a fiber-optic connection in accordance with an exemplary embodiment. The various components of the robotic system and the optical-fiber cables are labeled identically to those shown in FIG. 7. At least FIGS. 7 and 8a-f should be viewed together in connection with the description of operation various embodiments in accomplishing insertion of an optical jumper or cross-connector.

In operation, robotic arm 708 obtains the appropriate length of optical-fiber from fiber supply unit 709 which contain a fiber-optic spool (not shown). These spools are commercially available and can contain as much as 40 kilometers of optical-fiber. The end of robotic arm 708 has fingers which grasp the optical-fiber from the spool and unravel the appropriate length. The correct length is determined by computer 301 in accordance with an algorithm that takes into consideration distance between coordinates of the target ports and any prior jumper buildup. Additional slack is added in a prescribed or random manner to promote ease of penetration by the encapsulator needles in subsequent insertion attempts. Fiber supply unit 709 also includes an appropriate cleaving function to achieve not only the correct length, but also the correct optical-fiber cut. The fiber supply unit of the preferred embodiment is commercially-available, for example, the fiber preparation unit AutoPrep II™ system, manufactured by 3SAE.

As noted, the algorithm takes into account at least (a) the actual distance between the two specific ports that are to receive the jumper and (b) additional length allowing cable slack to enable wiggling forces of encapsulator needle 504 to operate effectively on the cable buildup and push it out of the way. Without any flexibility in previously attached cables, the wiggling tip shall not be able to effectively push aside the cable buildup as the tip is moved into position at its targeted port. And, as noted, appropriate length of cable is thus automatically cleaved at an appropriate angle which can be at right angles to direction of light propagation in the cable, or at some optimum offset angle such as eight degrees measured from a plane perpendicular to direction of light propagation in the cable. The offset angle helps to reduce unwanted light reflections by absorbing them into the fiber-optic cladding which envelops the optical glass fiber.

There are three directions (X, Y, Z) associated with the multi-port splicing panel. The surfaces of the panel lie in planes defined by the X and Y directions. One edge of the panel lies in the X direction and its two adjacent edges lie in the Y direction. The thickness of the panel is measured in the Z direction. The accumulated mass of previously connected jumper cable, therefore, piles up in the X, Y and Z directions. Robotic arms 712 and 713, as well as the other robotic arms, can maneuver in the X, Y and Z directions to accomplish their tasks.

The cut cable is then transferred by operation of robotic arm 708 under computer control to robotic arms 712 and 713 wherein it is identified in FIG. 7 as cable 705. Robotic arms 712 and 713 maneuver the ends of cable 705 into position within their respective encapsulator needles 504 (shown in FIG. 5) and, responsive to computer control, move those needles in X, Y and Z directions and into position near fiber-lockers 706 of splicing-tubes 701 of their respective targeted ports. This positioning of these encapsulating needles utilizes appropriate wiggling to get past any prior cable buildup as may be needed. Then the encapsulating needles 504 open up allowing working unit 502 (shown in FIG. 5) encapsulated in each needle to emerge from its encapsulation by robotic operation, and robotically insert exposed optical-fiber through the fiber-locker 706 and into its appropriate position in splicing-tube 701. A locking then takes place by operation of fiber-lockers 706 to hold cable 705 in place.

Figure 8:
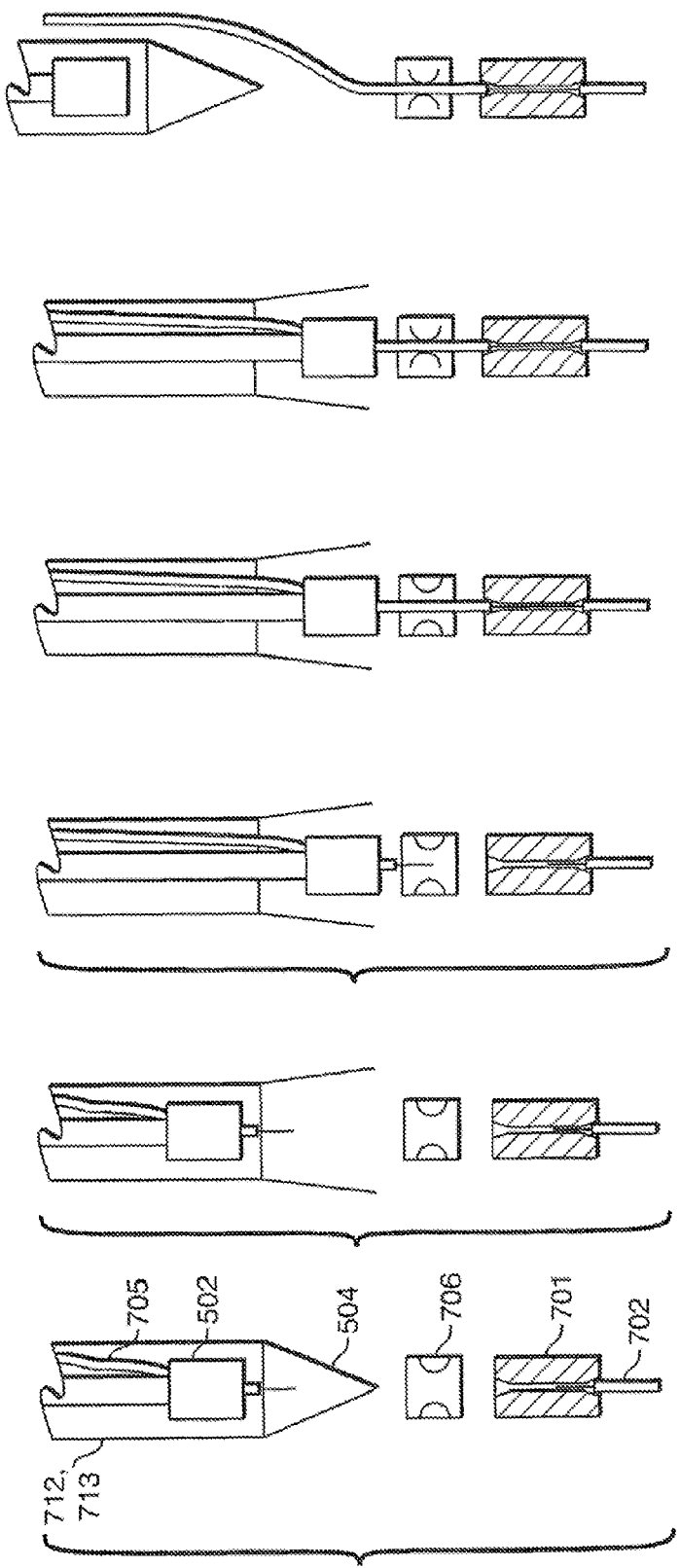
FIGS. 8a, 8b, 8c, 8d, 8e and 8f are six schematic diagrams depicting progress in an exemplary making of a fiber-optic connection.

Referring to FIG. 8a, robotic arm 712 or 713 is shown containing the working unit 502 and optical-fiber jumper 705, where encapsulating needle 504 is in its closed position and located near the fiber-locker 706 of its respective targeted splicing-tube 701. FIG. 8b shows the same subject matter as described in FIG. 8a but with encapsulating needle 504 shown schematically in an opened state, to allow the encapsulated end of optical-fiber 705 to emerge therefrom. FIG. 8c shows the same subject matter as that shown in FIG. 8b but with working unit 502 displaced forwardly in the Z direction, into the space provided by the opened encapsulating needle, thereby inserting the end of optical-fiber 705 into the space controlled by fiber-locker 706. FIG. 8d, shows the same subject matter as that shown in FIG. 8c, but with jumper cable 705 displaced forwardly in the Z direction responsive to robotic operation to the extent that the end of the optical-fiber of cable 705 mates with the end of optical-fiber of cable 702 inside splicing-tube 701. FIG. 8e shows the same subject matter as that shown in FIG. 8d, but with fiber-locker 706 in its closed position, thereby clamping jumper cable 705 in a fixed position. FIG. 8f shows the same subject matter as that shown in FIG. 8e, but after robotic arm 712 or 713 has released jumper fiber 705, has recalled working unit 502 into its enclosed position inside robotic arm 712 or 713 and has closed encapsulating needle 504. In the state shown in FIG. 8f, robotic arm 712 or 713 is depicted retreating in the Z direction, and on its way to a parking position where it shall await its next task.

Figure 9:
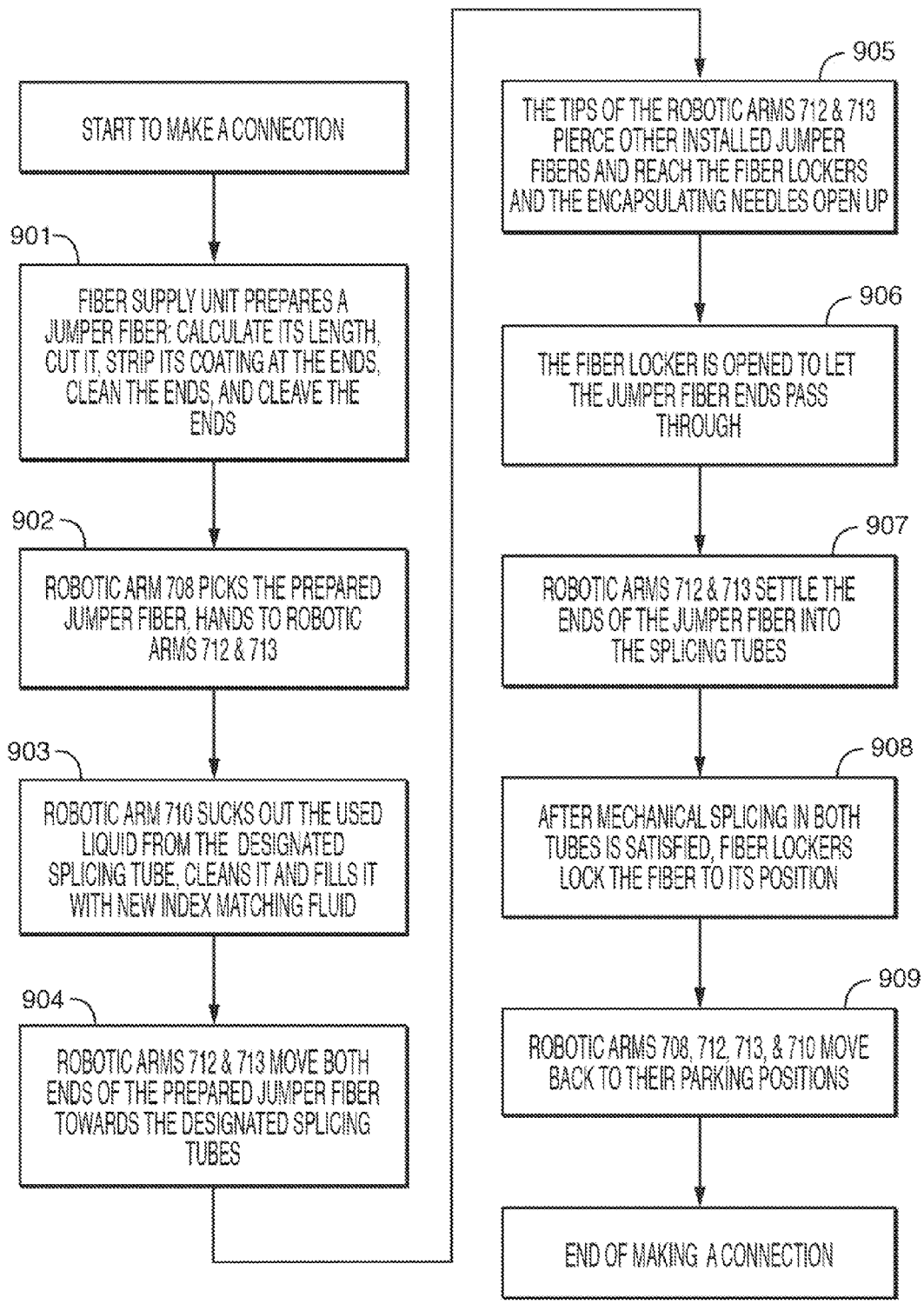
FIG. 9 is a flowchart showing exemplary methodology for making a new fiber-optic connection.

FIG. 9 is a flowchart showing methodology for making a new fiber-optic connection according to an exemplary embodiment. In step 901, fiber supply unit 709 prepares a jumper fiber by (1) calculating its length in accordance with panel port coordinates for targeted ports and other considerations noted above, (2) cutting the fiber at the appropriate length, (3) stripping insulating coating or cladding at the ends of the jumper, (4) cleaning the ends and (5) cleaving the ends at either a right angle to the direction of optical signal propagation, or at some other angle such as, for example, an eight degree angle measured with respect to a plane perpendicular to direction of optical signal propagation. The non-orthogonal angles are chosen to achieve optimum attenuation of unwanted signal reflections. These steps may be performed automatically by commercially-available equipment. For example, the above-mentioned fiber preparation unit manufactured by 3SAE performs some of these functions.

In step 902, robotic arm 708 picks up the prepared jumper fiber and hands it over to robotic arms 712 and 713 which properly position the cleaned and cleaved ends of the jumper fiber into their respective positions internal to closed encapsulator needles 504. Next, in step 903, robotic arm 710 sucks out any used optical-index-matching fluid from the targeted splicing-tubes, cleans both tubes and fills that pair of tubes with new index-matching fluid, as may be needed. In step 904, robotic arms 712 and 713 move both ends of the prepared jumper fiber, now designated as jumper 705, in the X, Y and Z directions towards the designated or targeted splicing-tubes. In step 905, encapsulator needles 504, with appropriate wiggling as may be needed, bypass any other previously installed jumper fibers that are in the path of robotic arms 712 and 713 and reach their respective fiber-lockers 706 located adjacent the targeted splicing-tubes where the needles open up. In step 906, if either fiber-locker is in a closed position, it is opened to allow the ends of the jumper fiber 705 to pass through the lockers. In step 907, robotic arms 712 and 713 settle, or insert, the ends of jumper fiber 705 into targeted splicing-tubes 701.

After the mechanical splicing occurs in strict accordance with distance and orientation constraints imposed by each of the pair of targeted splicing-tubes, the fiber-lockers 706 are returned to their locked position. These constraints are based on distance-stops and on keys that permit only particular orientation, well known in the connector industry. Alternatively, the outer shape of the cable can be rectangular or some other non-circular shape to provide proper orientation. Male and female aspects of the ports/jumpers are properly matched to conform precisely to the distance stops and to the orientation key/configuration constraints. The fiber-lockers hold jumper 705 in locked position, whereby this particular targeted pair of ports or splicing-tubes 701 makes an optical connection between signal generating and signal receiving equipments connected to those ports via optical cables 702. In step 909, robotic arms 708, 712, 713 and 710 return to equilibrium or parking positions awaiting the next command from computer 301.

Referring again to FIG. 7, the reverse operation of removing previously connected jumpers is accomplished by way of robotic arm 714. If, for example, optical signal generating and receiving equipment (not shown in FIG. 7), which are communicatively connected via optical fiber cables 702 through a particular jumper, no longer need, or wish, to be so connected, robotic arm 714 can be directed to panel coordinates corresponding to locations of the ports or splicing-tubes in which the ends of that particular jumper are being held by their respective fiber-lockers. Referring back to FIG. 4b, the particular jumper, e.g., can be jumper C7-H2.

An encapsulating needle 719 is affixed to the end of robotic arm 714, similarly to those affixed to the ends of the other robotic arms discussed above. Robotic arm 714 contains a working unit (not shown in this Fig.) similar to working unit 502 which controls clamping fingers (not shown). After the closed needle has made its way in the X, Y and Z directions to fiber-locker 706 associated with, for this example, location C7, where it may have made its way through a potential maze of previously connected jumper cables (recall that the actual physical state of these jumpers is slack, not taut as shown), the encapsulating needle opens up. The enclosed clamping fingers are allowed to emerge and clamp upon the end of cable 707 at location C7. The fiber-locker at location C7 then opens up allowing the C7 end of the cable to be removed from its spliced position within its splicing-tube by operation of the clamping fingers of the robotic arm pulling on the cable. Then, fingers of robotic arm 714 open up and release cable 707 at that location. At this point, the C7 end of cable 707 is loose and the H2 end of the cable remains connected.

Robotic arm 714 is then moved in X, Y and Z directions by way of computer control so that it can be re-positioned at the splicing-port located at other coordinate of this jumper, coordinate H2. Accordingly, the end of robotic arm 714 with its closed encapsulator needles again moves in the Z direction to make its way through any maze of previously-connected cross connector cables, with above-described vibrating or wiggling motion as may be needed, to reach the splicing-port located at coordinate H2. Again, the clamping fingers emerge, but this time they grab cable 707 at coordinate H2 whereupon its respective fiber-locker opens up. (Alternatively, the fiber-locker can open prior to grabbing the cable by the clamping fingers.) The end of cable 707 at its H2 coordinate is pulled from its splicing-tube 701, after which cable 707 is dragged away by retreating movement of arm 714 to waste bin 715 in which cable 707 is deposited for discard purposes. This completes the jumper-removal process.

Before splicing-tubes at locations C7 and H2 can be re-populated with ends of another cable or with ends of different cables, the tubes are cleaned by operation of robotic arm 710. The cleaning can be performed at any point in the cycle prior to insertion of the next jumper cable end; for example, it can be performed immediately after completion of each jumper removal process, or it can be performed just prior to the start of each jumper installation process. The end of robotic arm 710 is equipped with an encapsulator needle 720 enabling it to be directed through a maze of cables, if any, to these locations in the manner described above. After robotic arm 710 is located at the first location to which it is directed, e.g., coordinate C7, encapsulator needle opens to permit a vacuum cleaner to emerge to vacuum the inside of the splicing-tube at this coordinate to remove any residue therefrom. Robotic arm 710 is moved in the X, Y and Z directions to coordinate H2 where the cleaning process of the splicing-tube at this coordinate is also made. This completes the tube-cleaning process.

FIG. 10 is an alternative embodiment to that shown in FIG. 7 wherein vertical orientation of the optical-fiber patch panel and robotics of the robotic subsystem is reversed. In other words, FIG. 10 represents essentially an upside-down view of FIG. 7. In this situation, cables 703 and 704 and any other cables that were previously connected to ports in panel 303 hang down loosely from panel 303 which facilitates insertion of new jumper cables, because these vertically-hanging jumper cables offer less resistance to the wiggling encapsulator needle than piled-up jumper cables which occur in an embodiment in accordance with FIG. 7.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. For example, the order of steps or acts described herein need not take place in the exact order presented. The construction of components used in embodiments of the present invention can be from various materials including plastic and/or metal. The robotics of the present invention need not conform in every detailed respect to the description made herein; the robotics can be obtained from commercially-available sources, or can be designed as may be needed. The computer and the application software being run by the computer to guide the robotics are commercially available. However, special application software can be written to accomplish the tasks described herein. Accordingly, the specification and drawings are to be regarded in an illustrative rather than restrictive sense.

What is claimed is:

1. A system comprising:
   a computer;
   a robotic subsystem controlled by said computer; and
   a multi-port panel having two sides and including a plurality of optical-fiber splicing-ports extending therethrough, wherein:
   each one of certain of said plurality of optical-fiber splicing-ports accessible on one of said two sides interconnects with a different optical-fiber cable that can carry a signal to, or from, said each one of said certain of said plurality of ports; and
   at least one pair of said certain of said plurality of optical-fiber splicing-ports accessible on the other of said two sides of said panel is communicatively coupled together by an optical-fiber cable jumper having two ends, each one of said two ends being automatically inserted by operation of said robotic subsystem into a respective port of said pair of optical-fiber splicing-ports;
   whereby said different optical-fiber cable that carries a signal to, or from, one optical-fiber splicing ports of said pair of optical-fiber splicing-ports is communicatively coupled to said different optical-fiber cable that carries said signal from, or to, respectively, the other port of said pair of ports, and said robotic subsystem comprising two hollow end-encapsulator needles each located at a respective one of said each one of said two ends to envelop said each of said two ends said needles being geometrically configured to permit ease of threading between any other cable jumpers previously connected to other pairs of ports and displaced transversely to direction of insertion of said two ends.

2. The system of claim 1 wherein said each one of said two ends of said jumper is automatically removed, by operation of said robotic subsystem, from said respective port of said pair of ports.

3. The system of claim 2 wherein said removed jumper is automatically discarded by operation of said robotic subsystem.

4. The system of claim 3 wherein each of said plurality of optical-fiber splicing-ports includes a splicing-tube and wherein, after said removed jumper is automatically discarded by operation of said robotic subsystem, each said splicing tube is cleaned in preparation for making a subsequent connection, whereafter index matching fluid is automatically injected into said splicing-tube of each said respective port of said pair of ports by operation of said robotic subsystem to ensure that there is no reflection of said signal from an end of said different optical-fiber cable positioned in said each said respective port of said pair of ports.

5. The system of claim 4 wherein, prior to a subsequent jumper insertion into either said respective port of said pair of ports, cleaning of any residual said fluid in said either said respective port is accomplished by vacuuming under control of said robotic subsystem.

6. The system of claim 2 wherein said robotic subsystem comprises:
two robotic arms having ends with a cable-gripper at the end of each said robotic arm for gripping said optical-fiber cable jumper at said ends of said jumper to remove said jumper; and
two hollow end-encapsulator needles, each located at the end of said each said robotic arm for enveloping each said cable-gripper, said end-encapsulator needles being geometrically configured to permit ease of threading between any other cables displaced transverse to direction of motion of said two robotic arms when being placed into proper position for removal of said jumper;
wherein said end-encapsulator needles are controlled to unfold at the appropriate time and place to expose said cable grippers permitting gripping of said jumper cable to enable said removal under control of said robotic subsystem.

7. The system of claim 1 wherein each one of said end-encapsulator needles is configured to have a substantially conical exterior shape.

8. The system of claim 7 wherein said conical exterior configuration further comprises:
a plurality of similarly-shaped segments configured to unfold, in response to operation of said robotic subsystem, after said end-encapsulator needle is inserted into its respective port, thereby exposing said one of said two ends to enable appropriate splicing between optical-fiber of said exposed end and optical-fiber of said different fiber cable connected to said respective port.

9. The system of claim of claim 1 further comprising:
a dithering mechanism, controlled by said robotic subsystem, for dithering said end-encapsulator needles during said threading between said any other cables thereby enhancing ease of bypass of said any other cables during said automatic insertion.

10. The system of claim 1 wherein length of said optical-fiber cable jumper is automatically determined by operation of said computer.

11. The system of claim 10 wherein said operation of said computer is based on an algorithm which takes into account actual distance between ports of said pair of ports, additional effective distance between said ports of said pair of ports due to cable buildup on said panel transverse to orientation of said jumper due to communicative coupling by other jumpers between other pairs of ports, and a randomized slack factor causing said optical-fiber cable jumper to be other-than taut when connected between said pair of ports to enhance ease of bypass of said jumper by other end-encapsulator needles of other jumpers subsequently-inserted into other pairs of ports.

12. The system of claim 1 wherein each said port of said pair of ports further comprises:
a fiber-locker mechanism which operates under control of said robotic subsystem to lock one end of said optical-fiber cable jumper in communicative contact with said different optical-fiber cable connected to said port of said pair of ports, after one end of said optical-fiber cable jumper is inserted into said port of said pair of ports.

13. The system of claim 1 wherein said previously connected cable jumpers each have varying amounts of slack, said system further comprising:
a first support apparatus for holding said multi-port panel substantially parallel to ground in an orientation allowing each of said previously connected cable jumpers to dangle downwardly from said panel in response to gravitational attraction; and,
a second support apparatus for orienting said end-encapsulator needles to thread upwardly between said dangling cable jumpers when being automatically inserted into said pair of ports.

14. A method for managing communicative-coupling of a plurality of fiber-optic cables comprising:
manually connecting each of said plurality of fiber-optic cables to a different one of a plurality of ports on one of two sides of a multi-port panel, wherein said plurality of cables is fewer than, or equal to, said plurality of ports, and wherein said plurality of ports extends through said panel from said one side to the other side;
robotically connecting a plurality of fiber-optic jumper cables between pairs of said ports on said other side of said multi-port panel, each end of each one of said plurality of jumper cables connecting to a different one of said ports on said other side wherein said robotically connecting comprises optically-splicing within said panel, under robotic control, an end of said each of said plurality of fiber-optic cables to an end of a different one of said one of said jumper cables; and
robotically disconnecting selected ones of said plurality of fiber-optic jumper cables and discarding said selected fiber-optic jumper cables;
wherein, after said discarding is completed, said method further comprises:
cleaning splicing tubes of said ports corresponding to said selected ones of said plurality of fiber-optic jumper cables in preparation for making a subsequent connection or connections;
injecting index matching fluid into said splicing tubes to reduce any signal reflection associated with said subsequent connection or connections;
cutting other jumper cables to proper length for use in said subsequent connection or connections;
cleaning ends of said cut other jumper cables where said cables were cut;

cleaving said ends of said other jumper cables at an appropriate angle to reduce or minimize reflections of signals to be transmitted over said fiber optic cables and through said other jumper cables;

inserting, by robotic action, said other jumper cables into said splicing tubes to achieve proper optical connection with fiber optic cables connected to said splicing tubes; and locking said other jumper cables in place in said cleaned splicing tubes.

15. A system comprising:

a computer;

a robotic subsystem controlled by said computer; and a multi-port panel having two sides and including a plurality of optical-fiber splicing-ports extending therethrough, wherein:

each one of certain of said plurality of optical-fiber splicing-ports accessible on one of said two sides interconnects with a different optical-fiber cable that can carry a signal to, or from, said each one of said certain of said plurality of ports; and at least one pair of said certain of said plurality of optical-fiber splicing-ports accessible on the other of said two sides of said panel is communicatively coupled together by an optical-fiber cable jumper having two ends, each one of said two ends being automatically inserted by operation of said robotic subsystem into a respective port of said pair of optical-fiber splicing-ports;

wherein said each one of said two ends of said jumper is automatically removed, by operation of said robotic subsystem, from said respective port of said pair of ports, wherein said removed jumper is automatically discarded by operation of said robotic subsystem, and wherein each of said plurality of optical-fiber splicing-ports includes a splicing-tube and wherein, after said removed jumper is automatically discarded by operation of said robotic subsystem, each said splicing tube is cleaned in preparation for making a subsequent connection, whereafter index matching fluid is automatically injected into said splicing-tube of each said respective port of said pair of ports by operation of said robotic subsystem to ensure that there is no reflection of said signal from an end of said different optical-fiber cable positioned in said each said respective port of said pair of ports, whereby said different optical-fiber cable that carries a signal to, or from, one optical-fiber splicing ports of said pair of optical-fiber splicing-ports is communicatively coupled to said different optical-fiber cable that carries said signal from, or to, respectively, the other port of said pair of ports.

16. The system of claim 15 wherein, prior to a subsequent jumper insertion into either said respective port of said pair of ports, cleaning of any residual said fluid in said either said respective port is accomplished by vacuuming under control of said robotic subsystem.

17. The system of claim 15 wherein said robotic subsystem comprises:

two robotic arms having ends with a cable-gripper at the end of each said robotic arm for gripping said optical-fiber cable jumper at said ends of said jumper to remove said jumper; and two hollow end-encapsulator needles, each located at the end of said each said robotic arm for enveloping each said cable-gripper, said end-encapsulator needles being geometrically configured to permit ease of threading between any other cables displaced transverse to direction of motion of said two robotic arms when being placed into proper position for removal of said jumper;

wherein said end-encapsulator needles are controlled to unfold at the appropriate time and place to expose said cable grippers permitting gripping of said jumper cable to enable said removal under control of said robotic subsystem.

* * * * *